Patented Sept. 23, 1930

1,776,379

UNITED STATES PATENT OFFICE

OSCAR H. BERGER, OF BIRMINGHAM, ALABAMA, ASSIGNOR TO WM. P. McDONALD CONSTRUCTION COMPANY, OF FLUSHING, NEW YORK, A CORPORATION OF NEW YORK

COLD BITUMINOUS PAVING COMPOSITION

No Drawing.   Application filed July 13, 1927.  Serial No. 205,533.

This invention relates to bituminous surfacing compositions and more particularly to such compositions that are prepared from asphaltic substances, and which can be readily handled and laid while cold.

An object of this invention is to provide improved compositions of the type described, and a process of manufacture thereof whereby the same may be prepared and utilized in a convenient, efficient and economical manner.

In its more specific aspects one of the objects of this invention is to provide a process and products of the type described which are particularly adapted for use and incorporation in road construction whereby the products, while possessing all of the good qualities inherent in the heretofore known bituminous paving mixtures, have additional advantageous characteristics.

Other objects of the invention will in part be obvious and will in part appear hereinafter.

The invention accordingly comprises the several steps and the relation and order of one or more of such steps with respect to each of the others, and the products possessing the features, properties and the relation of constituents, which are exemplified in the following detailed disclosure, and the scope of the application of which will be indicated in the claims.

The present invention comprises an improvement in the process and the product disclosed in my copending application, Serial No. 51,717, filed August 21, 1925, in which is described a bituminous mixture and a process of making the same which is of the "cold-lay" type but differs from cold lay mixtures known to the prior art, particularly in that it is not an "emulsion" or a "cut back".

As pointed out in my said copending application, the asphalt cement is prepared by the use of a hard and relatively pure asphalt substance, as for example, an asphalt containing about 60% or over of bitumen, and having a penetration of from 0 to 3 or 4 at 115° F., 100 grams, 5 seconds, and with the use of fluxing oils containing a higher percentage of the more volatile oils than are used in the usual hot-mix practice, where, on account of the high temperatures used, it is possible, with due regard to safety, to employ only fluxes of the oil residuum type having low volatility and high flash points.

More specifically the asphalt substance which is preferred is a native asphalt having the properties described, which is known as "Cuban asphalt" and which may be used without preliminary refining; and the fluxing agents preferred are petroleums of the asphaltic, semi-asphaltic or paraffine base type, either in the crude or slightly topped form (for example, to the gasoline or kerosene stage) as, for example, Mexican petroleum; which are used in substantially their natural state although they may have the moisture removed therefrom and may even have the top fractions, such as gasoline and kerosene, removed, as long as the principal and characerisic constituents of the remaining oil are in substantially their natural polymerized and/or interrelational state; such fluxing materials being hereinafter referred to as "fresh oils".

Further as pointed out in my said copending application, the temperatures of fluxing should preferably not exceed a point which would cause any substantial loss of the light volatile elements of the oil, as, for example, not over 200–250° F., and, when preparing sheet asphalt and/or asphaltic concrete mixtures, the aggregate may be heated slightly to facilitate mixing, as, for example, to from 150–200° F.

The said copending application also discloses that the ratio of the fluxing oils to the asphalt may range from approximately equal proportions of each by weight, to as much as one-half again as much fluxing oil as asphalt, whereby an asphalt cement is obtained which has a consistency such that at 115° F. it gives a float test of about 5 or 6 minutes, as compared to a float test of 25 or 30 minutes, required for the usual hot-mix asphalt cement under the same conditions; that, when making a sheet asphalt or asphaltic concrete mix, the asphalt cement thus prepared may be added to the aggregate in amounts of from 5% to 8% by weight;

that mixes so prepared may be laid cold and may be stored for extended periods of time without appreciable lumping; that the material removed when making service cuts in a laid pavement may be rebroken and tamped back into place; and that a mixture so prepared is substantially unaffected by adverse weather conditions, may be laid by unskilled labor, without the use of hot tools and rollers, and when laid and compressed produces a long-lived and resilient pavement which will not become brittle in cold weather or soften in hot weather, and which may be opened to traffic substantially immediately after rolling.

In accordance with the present invention, which employs all of the novel and important features of the invention disclosed in my said copending application, I have found that by employing certain additional steps or treatments, not only can the life, workability, non-lumping and other desirable characteristics of the product previously produced be materially enhanced, but that also the ratio of the asphalt to the fluxing oils and the "richness" or percentage of asphalt cement in sheet asphalt and like mixes, can be increased without danger of lumping or loss of life or workability during extended storage periods. Consequently by the present invention the flexibility of the process is increased and the product may be altered at the will of the operator to meet even the more stringent requirements of long storage or to prepare the low penetration mixes of sheet asphalt or the like which are sometimes required by paving specifications.

The present invention comprises, briefly, a further processing of the mixture of asphalt cement and aggregate by incorporating therewith a small percentage of an ameliorating agent such as water or light oil, such as additional "fresh oil", which acts upon the mix to produce what I term a condition of "uniform un-uniformity". As nearly as can be ascertained, the production of this condition is dependent upon the combined abrading effect of the particles of the aggregate and upon the slight solubility or miscibility of the asphalt cement in or with the ameliorating agent. This processing step may be accomplished either by adding the ameliorating agent to the mix while it is still in the mixer, or material which has previously been mixed and stored in a pile may be again passed through a mixer, preferably of the pug-mill type, to incorporate the ameliorating agent therewith.

Such processing may be accomplished in a very short time, for example by continuing the mixing for about two minutes after the ameliorating agent is added, and the processing is complete when the mix loses its dark or black lustre and takes on a light brown color. At this time each individual particle of the aggregate appears to be more or less uniformly coated with bitumen, but the coating on some particles is much thinner than that on others and these variably coated particles are uniformly distributed throughout the mix; hence the term "uniform un-uniformity". It is believed that the thinly coated particles act to prevent any adhesion of the other and more heavily coated particles, thus ensuring a long retention of life and preventing any lumping which under certain conditions might otherwise tend to occur.

The amounts of ameliorating agent which are necessary to be used are relatively small, representing only about 3% to 5% by weight of the mix. I realize that the admixture of both water and oil with mixes of the "hot mix" type has been heretofore suggested, but such practices have been for the purpose of either hardening the hot-mix asphalt cement to prevent adhesion of the particles of the aggregate, or for converting the asphalt cement into an emulsion or cut-back. Obviously such action is not contemplated and does not occur in the present invention, since the ameliorating agent may, with substantially equal effectiveness, be incorporated after the mix is cold, and the small amounts thereof used and the shortness of the mixing required indicate that the favorable action is due neither to the formation of an emulsion with or to the cutting-back of the asphalt cement.

Since certain changes in carrying out the above process, and certain modifications in the composition which embody the invention may be made without departing from its scope, it is intended that all matter contained in the above description shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. A process of making a "cold-lay" paving mixture which includes preparing an asphalt cement by fluxing a hard asphalt having a penetration not substantially in excess of 4 at 115° F., 100 grams, 5 seconds, with an oil containing a substantial percentage of light volatiles, mixing the said asphalt cement with a mineral aggregate and thereafter treating the mixture by adding thereto an ameliorating agent and mixing until a light brown color of the mixture is obtained.

2. A process of making a "cold-lay" paving mixture which includes preparing an asphalt cement by fluxing a hard asphalt having a penetration not substantially in excess of 4 at 115° F., 100 grams, 5 seconds, with a "fresh oil" containing a substantial percentage of light volatiles, mixing the said asphalt cement with a mineral aggregate and thereafter treating the mixture by adding thereto an ameliorating agent and mixing until a light brown color of the mixture is obtained.

3. A process of making a "cold-lay" paving mixture which includes preparing an asphalt cement by fluxing a hard native asphalt having a penetration not substantially in excess of 4 at 115° F., 100 grams, 5 seconds, with a "fresh oil" containing a substantial percentage of light volatiles, mixing the said asphalt cement with a mineral aggregate and thereafter treating the mixture by adding thereto an ameliorating agent and mixing until a light brown color of the mixture is obtained.

4. A process of making a "cold-lay" paving mixture which includes preparing an asphalt cement by fluxing a hard asphalt having a penetration not substantially in excess of 4 at 115° F., 100 grams, 5 seconds, with a slightly topped "fresh oil" containing a substantial percentage of light volatiles, mixing the said asphalt cement with a mineral aggregate and thereafter treating the mixture by adding thereto an ameliorating agent and mixing until a light brown color of the mixture is obtained.

5. A process of making a "cold-lay" paving mixture which includes preparing an asphalt cement by fluxing a hard asphalt having a penetration not substantially in excess of 4 at 115° F., 100 grams, 5 seconds, with a "fresh oil" containing a substantial percentage of light volatiles, mixing the said asphalt cement with a mineral aggregate and thereafter treating the mixture by adding thereto from 3 to 5 percent of water and mixing until a light brown color of the mixture is obtained.

6. A process of making a "cold-lay" paving mixture which includes preparing an asphalt cement by fluxing a hard asphalt having a penetration not substantially in excess of 4 at 115° F., 100 grams, 5 seconds, with a "fresh oil" containing a substantial percentage of light volatiles at a temperature of about 200–250° F., mixing the said asphalt cement with a mineral aggregate at a temperature not materially in excess of the fluxing temperature, and thereafter testing the mixture by adding thereto an ameliorating agent and mixing until a light brown color of the mixture is obtained.

7. A process of making a "cold-lay" paving mixture which includes preparing an asphalt cement by fluxing a hard asphalt having a penetration not substantially in excess of 4 at 115° F., 100 grams, 5 seconds, with a "fresh oil" containing a substantial percentage of light volatiles, mixing the said asphalt cement with a mineral aggregate and thereafter treating the mixture by adding thereto from 3 to 5 percent of water in the mixer and continuing the mixing until a light brown color of the mixture is obtained.

8. A process of making a "cold-lay" paving mixture which includes preparing an asphalt cement by fluxing a hard asphalt having a penetration not substantially in excess of 4 at 115° F., 100 grams, 5 seconds, with a "fresh oil" containing a substantial percentage of light volatiles, mixing the said asphalt cement with a mineral aggregate, allowing the mixture to cool and thereafter treating the mixture by adding thereto from 3 to 5 percent of water and mixing in a pug mill until a light brown color of the mixture is obtained.

9. An artificially prepared composition of matter of substantially uniform consistency and having the properties of natural rock-asphalt, which is prepared from a hard native asphalt having a penetration not substantially in excess of 4 at 115° F., 100 grams, 5 seconds, a "fresh oil" flux containing a substantial percentage of light volatiles, a mineral aggregate, and an admixture of an ameliorating agent in an amount of from 3% to 5%.

10. A process of making a "cold-lay" paving mixture which includes preparing an asphalt cement by fluxing a hard asphalt having a penetration not substantially in excess of 4 at 115° F., 100 grams, 5 seconds, with a "fresh oil" containing a substantial percentage of light volatiles, mixing the said asphalt cement with a mineral aggregate and thereafter treating the mixture by adding thereto a small amount of water in the mixer and continuing the mixing until a light brown color of the mixture is obtained.

In testimony whereof I affix my signature.

OSCAR H. BERGER.